United States Patent [19]

Gast et al.

[11] Patent Number: 4,942,361
[45] Date of Patent: Jul. 17, 1990

[54] METHOD AND APPARATUS FOR DETERMINING EARTH RESISTIVITIES IN THE PRESENCE OF EXTRANEOUS EARTH CURRENTS

[75] Inventors: William F. Gast, Dallas; Charles F. Rhodes, Jr., Garland, both of Tex.

[73] Assignee: Oryx Energy Company, Dallas, Tex.

[21] Appl. No.: 202,603

[22] Filed: Jun. 7, 1988

[51] Int. Cl.$^5$ .............................................. G01V 3/02
[52] U.S. Cl. ...................................... 324/360; 324/357
[58] Field of Search ......... 324/347, 351, 354, 357–365

[56] References Cited

U.S. PATENT DOCUMENTS

| | | | |
|---|---|---|---|
| 2,796,235 | 6/1957 | Quigley | 324/357 X |
| 3,659,192 | 4/1972 | Ryss et al. | 324/357 |
| 3,701,940 | 10/1972 | Nilsson | 324/357 |
| 3,758,846 | 9/1973 | Ryss et al. | 324/357 |
| 3,810,000 | 5/1974 | Aspinall et al. | 324/357 X |
| 3,849,722 | 11/1974 | Nilsson | 324/357 |
| 4,041,372 | 8/1977 | Miller et al. | 324/357 |
| 4,295,096 | 10/1981 | Sternberg et al. | 324/357 |
| B1 4,295,096 | 7/1983 | Sternberg et al. | 324/357 |
| 4,446,434 | 5/1984 | Sternberg et al. | 324/357 X |
| 4,467,283 | 8/1984 | Owen et al. | 324/357 X |

Primary Examiner—Reinhard J. Eisenzopf
Assistant Examiner—Warren S. Edmonds
Attorney, Agent, or Firm—Kirk, Bissex & Lindsay

[57] ABSTRACT

Method and apparatus for measuring apparent earth resistivity, by determining potential drop produced by electric current injected into the ground. Periodic, or very low frequency polarity reversal of direct current is used to eliminate induced voltage errors that might otherwise occur with higher frequency polarity reversal or alternating current. Synchronizing pulses are used to gather and separately store information from each half cycle. A calibrated readout is obtained in which values of the voltages in the two half-cycles are algebraically subtracted and divided by two to measure the potential drop, with automatic compensation for effects of earth currents.

13 Claims, 1 Drawing Sheet

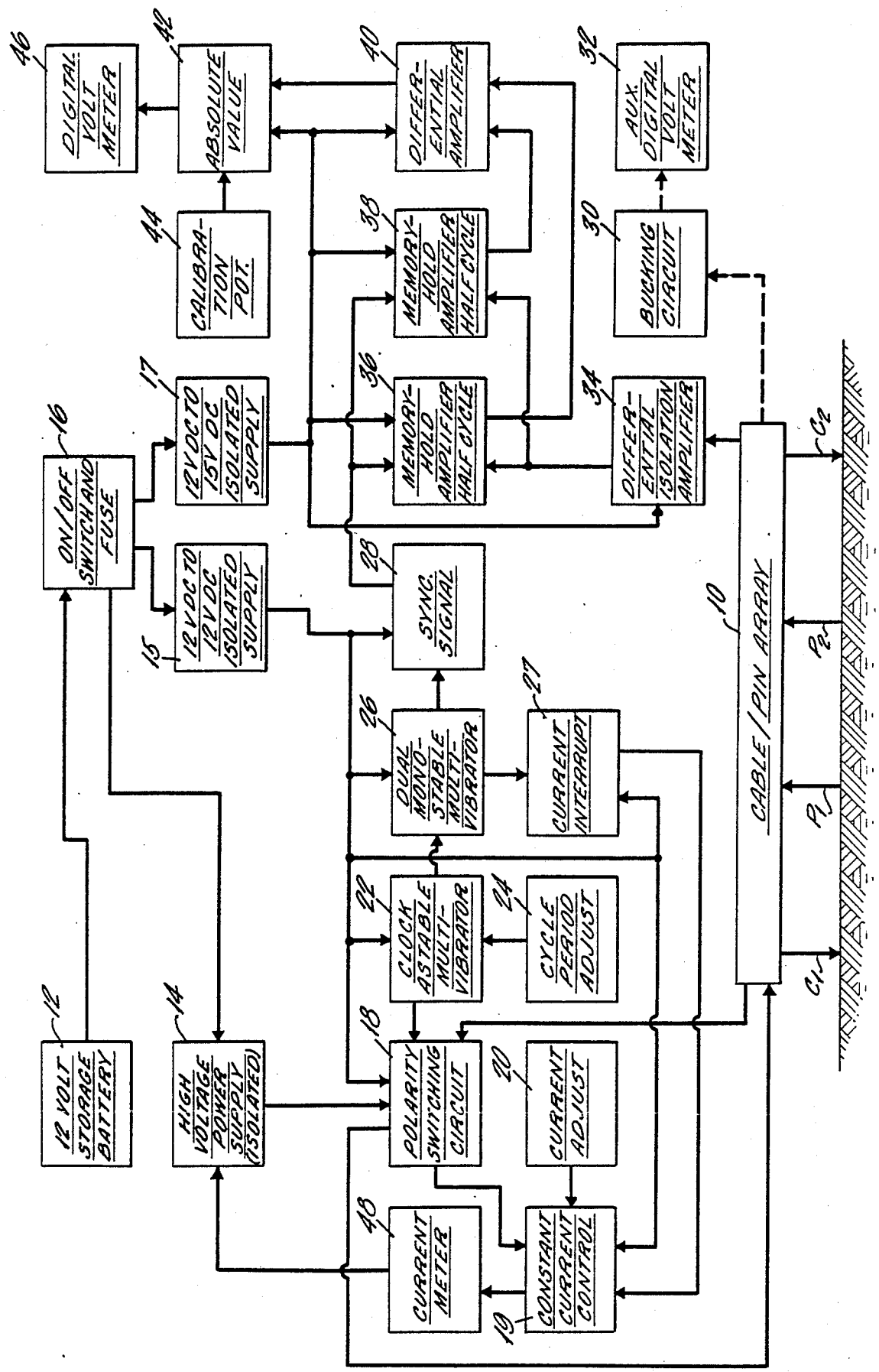

METHOD AND APPARATUS FOR DETERMINING EARTH RESISTIVITIES IN THE PRESENCE OF EXTRANEOUS EARTH CURRENTS

This invention provides apparatus and method for measuring apparent earth resistivity. Such measurements are useful in various aspects of exploration for mineral deposits, for example estimation of the depth to the top of a clay or rock layer, determination of the sequence in which low- and high-resistivity layers exist and estimation of their thicknesses.

There are several known methods and arrays for measuring apparent earth resistivity, such as the Wenner four-pin method, the Schlumberger, the Lee five-pin method and others.

There are several commercially available earth resistivity instruments which can be used to measure apparent earth resistivity values by the Wenner four-pin method for example. As far as is known, none of these that would be considered hand held or portable has the capability of providing reliable measurements at pin spacings greater than 50, or perhaps at most, 100 feet. Again, as far as is known, these instruments are limited by available output power and the associated circuitry to obtain meaningful results. Furthermore, by reason of the relatively high frequency of cycling the polarity of the square wave power output signal, these instruments are subject to introducing induced errors in measured voltages when using multiple take-out ground pin cable sets.

In one embodiment, the apparatus and method of the present invention provide means and method for obtaining satisfactory earth resistivity data at pin spacings up to 400 feet. This enables determination of earth layer sequence, thickness and resistivity from the earth's surface to depths of 200 to 300 feet. Such determinations are useful, for example, in prospecting for desirable depths at which to locate anodes for impressed current cathodic protection systems.

The apparatus and method of the present invention also provide novel and improved means and method for compensating for potentials produced by earth currents. The invention also minimizes polarization of ground pins during measurement and avoids induced voltage errors that might otherwise occur in multiconductor cable sets.

According to the invention, direct current is employed with periodic polarity reversals, the period preferably being between 0.25 and 4 seconds, to minimize polarization of ground pins during measurement, thus eliminating the attendant errors, and to render unnecessary procedures such as the time consuming practice of taking a multiplicity of readings and averaging the results which would otherwise be required in order to deal with such errors. Automatic compensation is continually made for potentials produced by earth currents, naturally occurring or otherwise, which may be varying in both magnitude and direction. This is done through memory-hold circuit, polarity reversing and differential amplifier features. Direct current is used, instead of alternating current, in order to eliminate induced voltage errors that are likely to be picked up in an alternating-current mode on voltage-measuring wires in multiconductor cable sets that are run to ground pins. According to this embodiment of the invention, multiconductor cable sets can be used without induced voltage errors, while eliminating the separation or shielding of wires that would, it is believed, be required with alternating current supply.

The invention provides an automatic polarity reversing circuit with variable cycle length control to minimize pin polarization, avoid induced voltage error due to said polarization and optimize measurement efficiency. Preferably, a constant-current output circuit is used to hold the applied current to a desired value throughout the time, for example two to ten seconds, during which the data for a particular pin spacing are being obtained. Values of current and voltage obtained according to the invention are used to calculate a resistance by Ohm's law for the pin spacing being observed, and apparent resistivity is calculated by appropriate known formula.

In one embodiment of the invention, current of about 10 to 100 milliamperes, and preferably at least 40 milliamperes, is provided at up to 600 volts, depending on need; voltage above 600 is usually unnecessary. The use of such current and voltage levels makes it possible to obtain satisfactory data at pin spacings up to 400 feet. Data can be gathered, checked and plotted to provide a resistivity profile at such spacings, with sufficient points for adequate definition, in relatively short periods of time, for example one hour.

Other advantages of the invention will appear from the following description of the invention.

The invention will be further described with reference to the drawing, which is a schematic diagram of the apparatus and electrical circuitry of one embodiment of the invention.

A cable/pin array 10 is comprised of pairs of multiconductor cables with multiple electrode takeouts and appropriate switching as known in the art, to permit selection of any of the desired pin spacings after setting out a sufficient number of pins to accommodate several pin spacing values. For convenience in this embodiment of the invention and to produce output data plots with relatively uniform point separation on the pin spacing axis of a log-log plot of pin spacing versus apparent resistivity, three pairs of cables are used sequentially. These cable pairs permit pin spacings of: (No. 1): 5, 10, 15, 20, 25, 35 and 45 feet, (No. 2): 60, 80, 100, 130 and 160 feet and (No. 3): 200, 250, 300, 350 and 400 feet. This arrangement provides a series of selectable current and potential pin spacings for determining apparent resistivities and layer depths at pin spacings up to 400 feet. When switched to a particular pin spacing, only those selected pin locations are live, thus precluding short circuiting effects from other pins set out but not currently selected.

Storage battery 12 is typically of ten ampere-hour capacity for normal jobs. Conveniently, a vehicle battery can be used. Switching power supply 14 converts 12 volt direct current obtained from battery 12, via on-off switch and fuse 16, to either 300 volt direct current or 600 volt direct current. The switching power supply 14 oscillates at 15 kilohertz. Maximum current output is 100 milliamperes. Polarity switching circuit 18 is comprised of dual double pole double throw relays, dual relays being used to increase the insulation characteristics of the relay contacts. Polarity switching circuit 18, with dual relays, handles both current going to the current pins in the cable/pin array 10 and current returning from cable/pin array 10. The latter path continues through constant current control 19 and current meter 48 on its circuit completion return to high voltage power supply 14. Current adjust potentiometer 20 establishes the desired current to be injected into the earth. The desired current, as selected by current adjust 20, is held stable for the entire measurement period by constant current control 19 which has sufficient control capability to produce identical output current for successive pin spacings, without further adjustment and read to tenths of a milliampere, for most commonly encountered values of current pin (C1, C2)-to-earth contact resistance within a particular measurement site. Astable multivibrator 22 is a square-wave oscillator whose frequency is adjusted by the cycle adjust potentiometer 24, to between 0.25 and 4 seconds per cycle. The output of the circuit actuates relay driver transistors not shown and provides firing pulses for monostable multivibrator 26. Dual monostable multivibrator circuit 26 provides square-wave pulses to actuate current interrupt circuit 27 and provide synchronizing pulses to the synchronizing signal circuit 28. Current interrupt circuit 27 interrupts current for 50 milliseconds at the beginning of each half cycle to permit relay switching with zero current flow. Synchronizing signal circuit 28 provides square-wave synchronized pulses to actuate memory-hold amplifiers 36 and 38. Differential amplifier circuit 34 amplifies the signal from the potential pins P1 and P2 and provides a gain of 2; the input is isolated from the output. Memory-hold amplifier 36 stores in memory the output of differential amplifier 34 for one half-cycle. Memory-hold amplifier 38 stores in memory the output of differential amplifier 34 for the alternate half-cycle. Differential amplifier circuit 40 amplifies the difference between the output of memory-hold amplifier 36 and memory-hold amplifier 38; the amplifier 40 has a gain of 1.25. Absolute value circuit 42 is an amplifier with a gain of 1, the output of which is always positive regardless of the input polarity. Calibration potentiometer 44 scales the output of the absolute value circuit 42. Digital voltmeter 46 uses an LCD readout to display potential P1 to P2, the output always being positive. Current meter 48 displays the current in milliamperes being injected into the earth. 12 volt direct current to 12 volt direct current isolated supply 15 provides power to circuits 18, 19, 22, 26, 27 and 28 and provides isolation from the automobile battery. 12 volt direct current to 15 volt direct current isolated supply 17 provides power to circuits 34, 36, 38, 40 and 42 and also provides isolation from the automobile battery. Bucking circuit 30 provides a series potential to offset voltages produced by natural earth currents; it is used only with the auxiliary digital voltmeter 32, which has an LCD readout to test circuitry and to serve as backup in case the primary measurement circuit fails.

The operation of the equipment shown in FIG. 1 is as follows:

Prior to start-up, the cable arrays 10 are placed on the earth's surface, with connections being made to steel rods or pins. The resistivity determining apparatus is connected to storage battery 12.

The high voltage power supply 14 selector is placed in the 300 V.D.C. position. The voltmeter 46 power is turned on. The main power switch 16 is then turned on.

The high voltage power supply 14 develops 300 V.D.C. and causes current to flow through the earth via the dual reversing relay contacts 18 and electrodes C1 and C2. The amount of current flowing is dependent upon the setting of the current adjust potentiometer 20. If the desired amount of current is not possible at 300 V.D.C., the high voltage power supply 14 selector switch can be set at 600 V.D.C.

When the main power is turned on, the astable multivibrator 22 begins operating at a cycle rate dependent upon the setting of the cycle adjust potentiometer 24. This rate is adjustable from 0.25 to 4 seconds/cycle. The output of the astable multivibrator 22 energizes or de-energizes the dual reversing relays 18, and provides starting pulses for the dual monostable multivibrator 26 (one pulse each half cycle). The dual monostable multivibrator 26 interrupts the current flow for 50 milliseconds each half cycle at the time the dual reversing relay 18 is switched to prevent high voltage arcing, and provides synchronizing pulses of 50 milliseconds duration to the synchronizing signal circuit 28.

As the current is switched, (positively, then negatively, etc.) the voltage developed across the two potential pins, P1 and P2 is in the form of a square-wave, with the potential dropping to zero for 50 milliseconds each half cycle when the current is interrupted. This potential, usually in the millivolt range, is connected to bucking circuit 30 and external digital voltmeter terminals 32, and to the input of isolation amplifier 34 with a gain of 2. The output of isolation amplifier 34 is connected to memory-hold amplifier circuits 36 and 38.

The synchronizing pulses from the dual monostable multivibrator 26 actuate two isolating photo transistors (not shown) in the synchronizing signal circuit 28 (one each half cycle). This initiates sample and hold signals for the memory-hold amplifiers 36 and 38. As a result, the analog information for one half cycle is stored in memory-hold amplifier 36, and the analog information for the remaining half cycle is stored in memory-hold amplifier 38. For example, with a square-wave signal of ±10 millivolts at the input of the differential isolation amplifier 34, whose gain is 2, memory-hold amplifier 36 stores (+)20 millivolts, and memory-hold amplifier 38 stores (−)20 millivolts.) Each half cycle the memory-hold storage data is updated. The outputs of memory-hold amplifiers 36 and 38 connect to the input of differential amplifier 40 whose gain is 1.25. Differential amplifier 40 amplifies the algebraic difference of the outputs of the memory-hold amplifiers 36 and 38. Thus, the total gain of the readout circuitry is 5.0 (2 from differential isolation amplifier 34, 2 from the algebraic subtraction of alternate polarity cycles and 1.25 from differential amplifier 40.) The output of differential amplifier 40 is connected to the input of absolute value circuit 42, whose output is positive regardless of the input polarity. Absolute value circuit 42 has a gain of 1. The output of absolute value circuit 42 connects to a calibration potentiometer 44, enabling calibration. The calibration consists of setting the output voltage to digital voltmeter 46 to a value equal to the input voltage to isolating differential amplifier 34 during one average half cycle. The algebraic difference between the values in the respective half-cycles is thus divided by two. For example, when the input voltage is (±)10 millivolts, the algebraic difference is 20 millivolts, and the output is calibrated to be +10 millivolts).

Natural earth currents are always flowing. As a backup system, if the memory-hold circuit fails, the operation includes the use of a bucking circuit 30 to cancel the potential developed by the flow of natural earth current. This permits easier reading of voltages, which may drift, by making them more nearly the same on alternate cycles. The bucking circuit serially adds a negative or positive potential to the measuring circuit to initially establish alternate cycle voltages that are the same. The bucking circuit and auxiliary digital voltmeter are only used as backup or to verify the operation of the primary meter and its memory-hold feature.

For example, with a natural earth current flowing, which develops a potential of (+)5 Millivolts between P1 and P2, and with current injected into the earth to cause a potential drop of (±)10 millivolts, the input to the isolation differential amplifier 34 is (+)15 millivolts for one half cycle, then (−)5 millivolts for the succeeding half cycle. The output of isolation differential amplifier 34 with a gain of 2, is (+)30 millivolts for one half cycle, then (−)10 millivolts for the succeeding half cycle. Memory-hold amplifier 36 stores (+)30 millivolts and memory-hold amplifier 38 stores (−)10 millivolts. The output of differential amplifier 40 is 40 millivolts×1.25 or 50 millivolts. The output reading through calibration 44 and absolute value circuit 42 is (+) 10 M.V.)

Thus, although potentials developed by natural earth currents can be highly negative or positive, their effect is completely cancelled by the use of the apparatus and method described.

According to the invention, the need to use a bucking circuit to produce an easily read output is eliminated since the absolute value feature gives an output that is always positive and the memory-hold circuit makes the output stable. A bucking circuit is unnecessary according to the invention, although it may be used as a backup.

Preferably according to the invention, polarity switching is done during a period of for example about 50 milliseconds when no current is flowing to prevent high-voltage arcing and consequent damage to relay contacts. Also, preferably, the polarity reversing cycle period is adjustable to permit optimization of measurement time and/or stability of voltage output readings. The current and voltage values appear as stable readings and therefore do not have to be read simultaneously. Consequently, one person can operate the instrument and read current and voltage sequentially. Preferably, isolation devices are used throughout the instrument to assure personal safety during high voltage operation.

The invention claimed is:

1. Apparatus for measuring earth resistivity which comprises:
   (a) means for providing square-wave direct current pulses,
   (b) means for injecting said current pulses through at least one pair of electrodes into the earth,
   (c) means for measuring the voltage of said pulses as received at electrodes in the earth at locations spaced apart from the location of electrodes for the injection of said current,
   (d) means for amplifying said measured voltage received at the electrodes,
   (e) two memory-hold amplifiers to receive said amplified pulses,
   (f) means for providing synchronizing of the pulses to said memory-hold amplifiers and for providing sample and hold signals to said amplifiers, whereby analog information concerning said amplified voltage is stored for one half-cycle in one of said amplifiers and for the remaining half-cycle in the other of said amplifiers,
   (g) means for amplifying the difference between the output of the memory-hold amplifiers,
   (h) an absolute value circuit for providing positive output regardless of the input polarity from the differential amplifier, and
   (i) voltmeter means for displaying potential between electrodes, 2. Apparatus according to claim 1 and additionally comprising means for switching of polarity of electrodes in each half cycle between the pulses.

3. Apparatus according to claim 1 wherein the frequency of said pulses is between 0.25 and 4 seconds per cycle.

4. Apparatus according to claim 1 and additionally comprising means for holding the current of said pulses to a substantially constant value during the measurement with a given electrode configuration.

5. Apparatus according to claim 1 wherein said pulses are provided at about 10 to 100 milliamperes and at voltages up to about 600 volts.

6. Apparatus according to claim 5 wherein the current of said pulses is at least about 40 milliamperes.

7. Method for measuring earth resistivity which comprises:
   (a) providing square-wave direct current pulses,
   (b) injecting said pulses through electrodes into the earth,
   (c) measuring the voltage of said pulses as received at electrodes in the earth at locations spaced apart from the location of the injection of said current,
   (d) amplifying the voltage of said pulses,
   (e) separately storing analog information concerning said amplified voltage produced by each half-cycle of said pulses,
   (f) amplifying the difference in amplified voltage of each half-cycle and providing the absolute value thereof; and
   (g) providing a calibrated readout of the values of the voltages in the two half-cycles.

8. Method according to claim 7 wherein flow of said current into the earth is interrupted for a portion of the pulse cycle during which the switching of polarity of electrodes occurs in each half-cycle.

9. Method according to claim 7 wherein the frequency of said pulses is between 0.25 and 4 seconds per cycle.

10. Method according to claim 7 wherein the current of said pulses is held to a substantially constant value during the measurement with a given electrode configuration.

11. Method according to claim 7 wherein said pulses are provided at about 10 to 100 milliamperes and at voltages up to about 600 volts.

12. Method according to claim 7 wherein the current of said pulses is at least about 40 milliamperes.

13. Apparatus according to claim 1 which additionally comprises a calibrating means, whereby the absolute value of the amplified differential voltage from the two half-cycles are divided by the total gain of the readout circuitry to determine the potential drop produced by said current pulses in passage through the earth.

* * * * *